United States Patent [19]
Pasch et al.

[11] 3,859,024
[45] Jan. 7, 1975

[54] TRANSFER MOLDING APPARATUS
[75] Inventors: Lambert Pasch, Nutheim; Heinz Wagemann, Aachen, both of Germany
[73] Assignee: Uniroyal A.G., Aachen, Germany
[22] Filed: Dec. 18, 1972
[21] Appl. No.: 316,165

[30] Foreign Application Priority Data
Dec. 23, 1971 Germany............................ 2164219

[52] U.S. Cl.......................... 425/251, 425/DIG. 228
[51] Int. Cl................................................ B29f 1/06
[58] Field of Search........... 425/251, DIG. 228, 252, 425/243, 244, 242, DIG. 229, DIG. 222

[56] References Cited
UNITED STATES PATENTS

| | | | |
|---|---|---|---|
| 2,300,759 | 11/1942 | Amigo ................... | 425/DIG. 229 X |
| 2,413,401 | 12/1946 | Youngblood et al. .......... | 425/145 X |
| 2,865,050 | 12/1958 | Strauss................... | 425/DIG. 229 X |
| 2,900,663 | 8/1959 | Linhorst................. | 425/DIG. 228 X |
| 3,015,131 | 1/1962 | Hehl ...................... | 425/DIG. 222 X |
| 3,121,918 | 2/1964 | Jurgeleit............................ | 425/190 |
| 3,360,829 | 1/1968 | Germ................................ | 425/251 |
| 3,392,217 | 7/1968 | Zitzloff...................... | 425/DIG. 228 |

*Primary Examiner*—Francis S. Husar
*Assistant Examiner*—David B. Smith
*Attorney, Agent, or Firm*—Philip Sands, Esq.

[57] ABSTRACT

An apparatus for molding elastomeric stock, comprising an apertured, heat-resistant, flexible, insulation plate between a heated mold and the discharge portion of an elastomeric stock injection unit such that respective mold cavities provided in the mold are aligned with respective apertures in the insulation plate which intercommunicate the mold cavities with an internal discharge chamber in the injection unit. The mold and injection unit are moved relative to one another such that each presses against the other through the intermediary of the insulation plate, thereby permitting expulsion and transferring of a portion of elastomeric stock from the injection unit into the mold cavities to be cured, an excess portion of elastomeric stock remaining in the injection unit being prevented from undergoing curing by means of the presence of the insulation plate.

28 Claims, 9 Drawing Figures

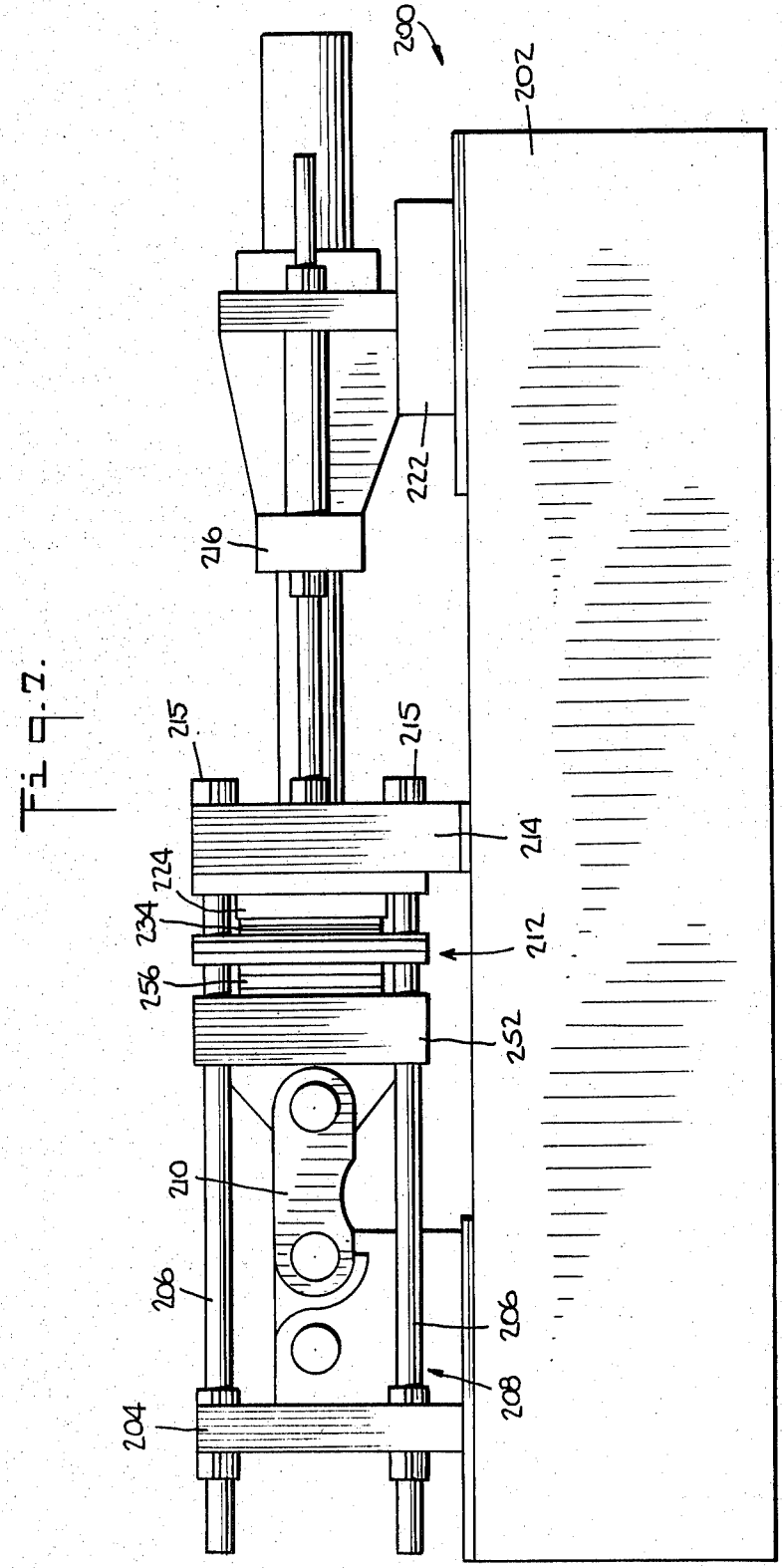

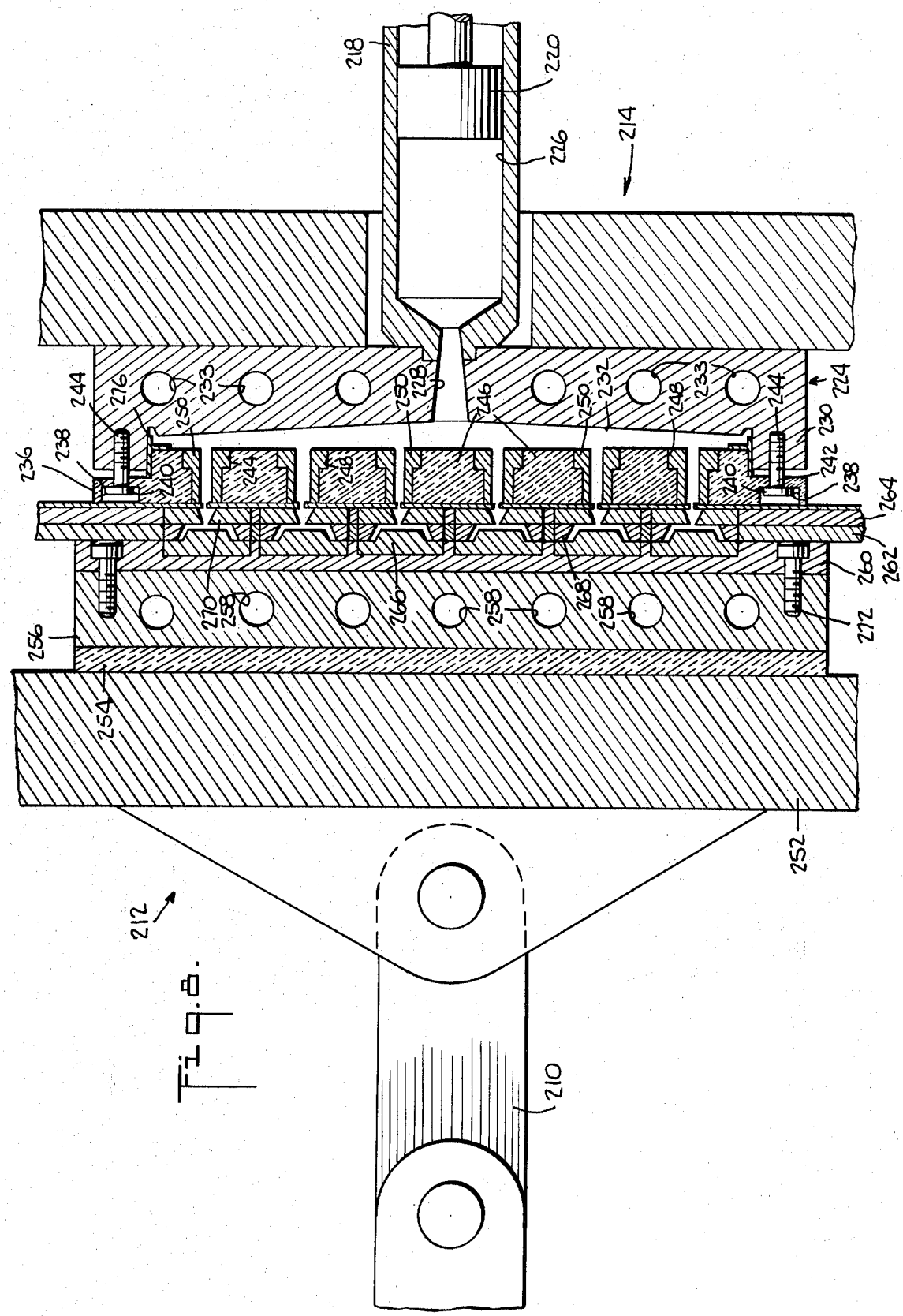

TRANSFER MOLDING APPARATUS

BACKGROUND OF THE INVENTION

This invention relates to apparatus for molding parts from viscous materials and, more particularly, to molding apparatus in which molding compound, or elastomeric stock, is transferred from an injection cylinder to a plurality of closed mold cavities through the intermediary of a plurality of passageways which intercommunicate the cylinder with the cavities.

One example of such a molding apparatus is the invention of Herbert F. Jurgeleit disclosed in U.S. Pat. No. 2,883,704, dated April 28, 1959. In this patent a multi-plate, "flashless" mold is provided having a plurality of cavities therein. The term "flashless mold" as used herein has reference to a multi-cavity, multi-part mold in which the cavity forming portions of the mold are independently movable sufficiently to permit independent stacking or closing of such portions either by reason of an actual flexure of the flexible plate member which either forms or directly supports such portions of the mold, or by reason of a movement of such portions relative to a retainer plate, and in which the force for independently closing or holding such cavity forming portions closed is transmitted to each group of cavity forming portions by a common conformable medium such as the molding compound or other conformable medium. Each cavity of the flashless mold is closed except for the presence of a plurality of passageways or sprues provided in the top plate of the mold which intercommunicate each cavity with the space above the top mold plate. In addition, an injection unit is provided which comprises an injection piston movable in an open-ended cylinder commonly referred to as a "bottomless cylinder." The injection unit is usually affixed to the lower surface of the heated, upper platen of a press and the mold is usually removably placed atop the upper surface of the heated, lower platen or ram cap of the press, directly in line with the injection unit.

In the operation of this apparatus, a quantity of molding compound in excess of that which would be sufficient to fill all the cavities is placed on the top plate of the mold, and the press is closed. During closure, the top plate of the mold contacts the lower end of the bottomless cylinder, closing the lower end thereof. As closure of the press continues, the mold and cylinder move upward relative to the injection piston, causing the molding compound atop the mold to become compressed between the injection piston and the top mold plate and to flow through the various sprues into the respective mold cavities. The excess compound in the injection cylinder is maintained under compression both during filling of the cavities and during the time that it takes for the heated upper and lower platens to cure the compound in the filled cavities. This maintains hydraulic pressure on the top plate of the flashless mold in order to keep the cavities closed during the filling and curing period (limiting flash formation at the mold parting lines) and in order to prevent backrinding or backflow of the compound from the cavities through the sprues (with the creation of attendant, undesirable blemishes on, and/or changes in, the dimensions of the parts being molded in the cavities). In this process, however, the excess compound in the injection cylinder is cured along with the compound in the mold cavities and represents waste which is generally scrapped.

Various attempts have been made to improve on the above prior art procedure in order to overcome the losses inherent in the scrapping of the molding compound which is cured in the injection cylinder. One such attempt culminated in the invention of Herbert F. Jurgeleit disclosed in U.S. Pat. No. 3,070,843, dated Jan. 1, 1963. In that process, a piston-cylinder injection unit is closed by a flexible, metallic plate, which plate not only allows the hydraulic pressure of the molding compound to be transmitted to the top mold plate of a mold (single or multiple cavity, flashless or nonflashless) during the injection cycle (to thereby assist in keeping the mold cavities closed during such injection), but retains the molding compound in the injection unit when the molds are thereafter moved away from the injection unit into a separate heated, curing area. With this arrangement, curing of the excess compound in the injection unit may be avoided. However, this is at the expense of providing a plurality of molds and a separate curing area. Moreover, when the injection cylinder and mold are separated to facilitate movement of the mold to the separate curing area, the pressure in the cavities and on the top mold plate is released, allowing, to some degree, backrinding of compound through the sprues and possible flash formation at the parting lines of the mold.

Another attempt to overcome the losses inherent in the scrapping of molding compound which is cured in the injection cylinder is exemplified by the invention of Herbert F. Jurgeleit disclosed in U.S. Pat. No. 3,121,918, dated Feb. 25, 1964. In this process, a piston-cylinder injection unit, which cooperates with a multi-cavity, clashless mold, is also closed by a flexible, metallic plate but, instead of moving the mold to a separate, heated, curing area to prevent curing of the excess compound in the injection cylinder, the injection cylinder itself is moved to a cool area while the mold remains in the heated area and the compound in the cavities is cured. In this instance, again, the injection pressure is relieved after the cavities have been filled in order to allow removal of the injection cylinder. Accordingly, backrinding may occur at such time, resulting in the formation of blemished parts, parts whose dimensions may fail to match precisely the dimensions of the cavities in which they are formed, and/or parts whose density may be less than that required by the specifications for the parts.

SUMMARY OF THE INVENTION

Accordingly, it is a principal object of the present invention to obviate the formation of waste or scrap within the injection cylinder of a molding apparatus by insulating the injection cylinder from the mold to prevent curing of an excess portion of elastomeric stock remaining within the injection cylinder while the latter remains in biasing relation with the mold.

It is a further object of the present invention to provide an insulation plate at the end of a "bottomless cylinder," the open end of the bottomless cylinder having a cross-sectional area which, in terms of the pressure developed therein, provides a mold closing force that is substantially greater than the corresponding mold opening force resulting from the projected area of, and pressure developed in, the combined mold cavities of the mold. This relationship prevents the mold cavity portions from separating from one another along their mutual parting lines and substantially obviates the seepage of flash forming elastomeric stock at the parting lines of the mold.

It is still a further object of the present invention to provide an insulation plate between an injection cylinder and a multi-cavity mold, whether the mold be of a flashless or non-flashless construction.

It is another object of the present invention to provide an insulation plate which is to be interpositioned between an injection cylinder and mold, irrespective of whether the injection cylinder and mold are movable horizontally or vertically relative to one another.

It is a further object of the present invention to provide an insulation plate which is mounted upon on injection cylinder and interposed between the latter and a mold, the insulation plate being either of fixed nature relative to the injection cylinder or slightly axially movable relative thereto.

It is another primary object of the present invention to provide a method of fabricating an insulation plate which, at least in the last stages of the forming of the insulation plate, utilizes the structure of the injection cylinder and mold to provide aperture locating reference marks on the insulation plate.

Briefly stated, the apparatus of the present invention generally comprises a heated mold having a plurality of mold cavities, an elastomeric stock injection cylinder having an open ended chamber in which elastomeric stock is disposable and form which elastomeric stock is transferable, and a heat-resistant, flexible, end insulation plate interposed between the mold and injection cylinder and having a plurality of apertures which are aligned with corresponding mold cavities to permit transferring of elastomeric stock from the injection cylinder into the mold cavities. An assembly is provided for moving the mold and injection cylinder relative to one another so that an exposed end face presented by the mold cavities is brought into flush pressing engagement with the insulation plate. The injection cylinder includes a piston for exerting pressure in the chamber against the elastomeric stock to expel and transfer at least a portion of the latter therefrom into the mold cavities through the intermediary of the corresponding insulation plate apertures. The heat-resistant, flexible end insulation plate acts to prevent the heated mold from curing an excess portion of the elastomeric stock remaining in the injection cylinder during curing of that portion of the stock which was transferred into the mold cavities.

BRIEF DESCRIPTION OF THE DRAWINGS

The above and additional objects and advantages of this invention will be more clearly understood from the following detailed description thereof when read in conjunction with the accompanying drawings in which:

FIG. 7 is a schematic, front elevational view of a horizontally movable press having toggle-linkage actuating members;

FIG. 8 is an enlarged, fragmentary, vertical cross-sectional view of the press members of FIG. 7 biasing against one another through the intermediary of an axially movable insulation plate, the mold cavity-defining portions being of the flashless variety.

DETAILED DESCRIPTION OF THE INVENTION

Figure 1:
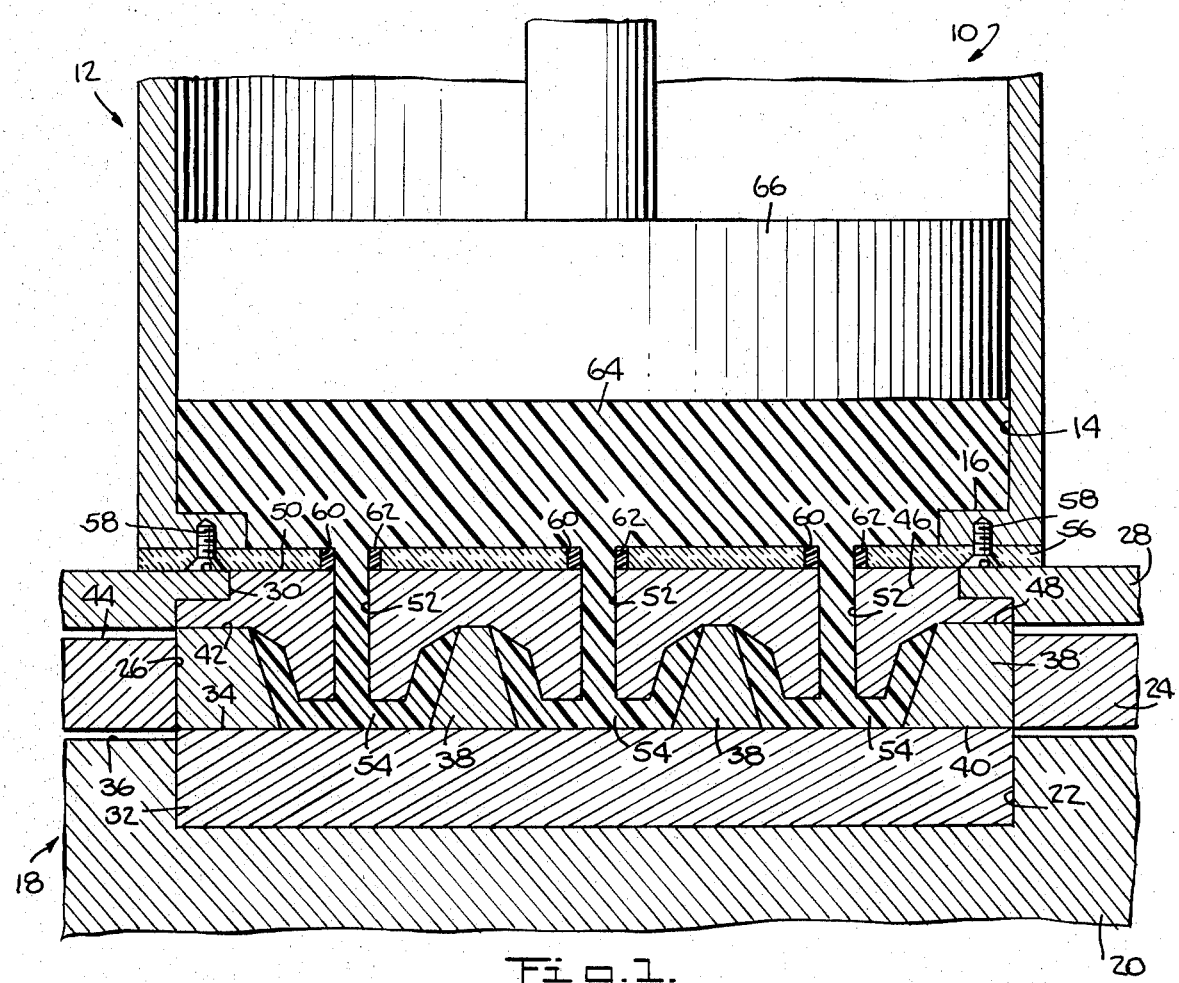
FIG. 1 is a fragmentary, schematic, vertical cross-sectional view of a bottomless injection cylinder having an insulation plate fixed and constrained against axial movement relative thereto, and an associated multi-cavity, non-flashless mold.

Referring now to the drawings, and more particularly to FIG. 1 thereof, the present invention relates to transfer molding apparatus denoted generally by the reference character 10. The apparatus 10 includes an axially movable injection cylinder 12 (of the bottomless cylinder variety) having an open ended chamber 14 and a lower, inwardly disposed annular flange 16. Beneath the injection cylinder 12 there is provided an axially movable mold assembly 18 (heated conventionally by means not shown) having a base plate 20 in which is provided a cylindrical chamber 22, a central plate 24 in which is provided a cylindrical chamber 26, and an upper plate 28 in which is provided a cylindrical chamber 30. The plates 20, 24 and 28 are superposed upon one another such that their respective chambers 22, 26 and 30 are coaxially aligned in communicating relation with one another.

Confined within the cylindrical chamber 22 of the base plate 20 is a lower mold portion 32 having an upper face 34 which extends above the upper face 36 of the base plate 20. Arranged within the cylindrical chamber 26 of the central plate 24 is a central mold portion 38 having a lower face 40, which rests upon the upper face 34 of the lower mold portion 32, and an upper face 42 which extends above the upper face 44 of the central plate 24. Arranged within the cylindrical chamber 30 of the upper plate 28 is an upper mold portion 46 having a lower face 48 which rests upon the upper face 42 of the central mold portion 38. The upper mold portion 46 likewise has an upper face 50 and is provided with a plurality of apertures 52 which define respective passageways communicating with a plurality of mold cavities 54 defined by the cooperating mold portions 32, 38 and 46, the central mold portion 38 acting to axially space the lower mold portion 32 from the upper mold portion 46 to define the respective cavities 54 therebetween.

Interposed between the mold assembly 18 and the injection cylinder 12, and fixedly mounted upon the latter, is a heat-resistant, flexible, end insulation plate 56 (the nature of which will be fully discussed below), which is constrained against axial movement relative to the injection cylinder 12 by means of screws 58 or the like. A plurality of apertures 60 are provided in the insulation plate 56, the apertures 60 being respectively aligned with the passageways 52 provided in the upper mold portion 46. Each of the apertures 60 in the insulation plate 56 acts to support and confine respective low-friction annular inset elements 62 which likewise communicate with the respective mold cavities in the mold assembly 18, each of the inset elements 62 being constituted of a material similar to that available under the trademark "Teflon," e.g. polytrifluorochloroethylene, polytetrafluoroethylene, etc.

In operation, elastomeric stock 64, in the nature of natural or synthetic rubber, alkyl-phenol-resin, thermosetting resins such as phenol-, urea-, or melamine-formaldehyde-resin, epoxy resin, heat-resistant silicones, and acrylic resins, etc., is deposited into the injection cylinder 12, between the insulation plate 56 and a stationary piston 66. The piston 66 is disposed within the injection cylinder 12 and defines therewith the chamber 14.

The mold assembly 18 is then elevated into engagement with the injection cylinder 12 such that the heat-resistant, flexible, end insulation plate 56 lies flush and presses against the upper end face 50 of the upper mold portion 46 of the mold assembly 18. The low-friction annular inset elements 62 are now in direct axially communicating relation with the passageways 52 in the upper mold portion 46 which communicate with the respective mold cavities 54. As the mold assembly 18 is moved further upwardly, it carries therewith the injection cylinder 12 and reduces the axial extent of the chamber 14 (this because the piston 66 remains constrained against axial movement relative to the upwardly moving injection cylinder 12).

Thus, as the upwardly moving injection cylinder 12 causes a reduction in the axial extent of the chamber 14, a portion of the elastomeric stock 64 is expelled and transferred into the respective mold cavities 54. During the subsequent curing of the injected molding material, the heat-resistant nature of the insulation plate 56 prevents curing of the excess elastomeric stock 64 remaining in the chamber 14 despite the remaining biasing relationship of the mold assembly 18 with the injection cylinder 12.

The low friction annular inset elements 62 act to prevent the elastomeric stock 64 from adhering to the periphery of the apertures 60 of the insulation plate 56 as the elastomeric stock passes therethrough. Because of the flexible nature of the insulation plate 56, the latter is able to lie substantially uniformly flush against the entire end face 50 of the upper mold portion 46 to thereby obviate seepage of elastomeric stock 64 at the parting line therebetween.

As is evident from FIG. 1, the projected area of the chamber 14 is greater than the combined projected area of all of the cavities 54, this ensuring that the clamping pressure, that pressure which maintains the mold assembly 18 in operative biasing association with the injection cylinder 12 and which is substantially identical to the injection pressure, namely the pressure necessary for causing a transfer of the elastomer stock from the chamber 14 into each mold cavity 54, is sufficient to prevent the mold portions 32, 38 and 46 from separating from one another along their respective parting lines, separation which may otherwise result in an over-filling of the cavities 54, seepage at the mold parting lines and the formation of flash upon the molded product.

Pursuant to the principal concept of the present invention, the insulation plate 56 should be of rather thin flexible nature to minimize the axial extent of the passageway that the elastomeric stock 64 must traverse as it is transferred from the chamber 14 into the respective mold cavities 54. However, the insulation plate 56 should be of sufficient thickness to prevent the portion of the elastomeric stock 64 remaining in the chamber 14 from being cured during the curing of that portion transferred into the mold cavities 54.

In this respect, the particular nature or composition of the elastomeric stock 64 that is to be transferred from the chamber 14 into the mold cavities 54, in conjunction with the particular temperatures that are developed, such as in the range of 100°–200°C., will determine the necessary thickness of the insulation plate 56. Moreover, it has been determined that the insulation plate 56 should be preferably constituted of a mixture of asbestos fibers and a thermosetting resin, such as phenol resin or the like, and appropriately cured such that it is imparted with the necessary flexibility and heat-resistant qualities. It is preferable that the thermal conductivity of the insulation plate 56 be less than about 0.5 kcal/m/hr/°K, but it may exceed about 0.05 kcal/m/hr/°K. The compression resistance of the insulation plate 56 at temperatures of approximately 180°–200°C. should be not less than from about 200–2,000 kg/cm². The compression resistance rates the capacity of the plate 56 to withstand a compression load without undergoing permanent deformation. The modulus of elasticity of the insulation plate 56 should be at least, and preferably greater than, about $1.5 \times 10^5$ kg/cm².

Accordingly, when the insulation plate 56 is provided with such or similar properties, it will most effectively resist heat transfer from the heated mold cavities 54 to the remainder of the elastomeric stock confined within the chamber 14 of the injection cylinder 12. This will permit the mold assembly 18 to be maintained in effective pressing relation with the injection cylinder 12 while the transferred elastomeric stock within the confines of the mold cavities 54 is cured, and to obviate waste which would normally result upon curing of the remainder of the elastomeric stock 64 in the chamber 14.

Figure 2:
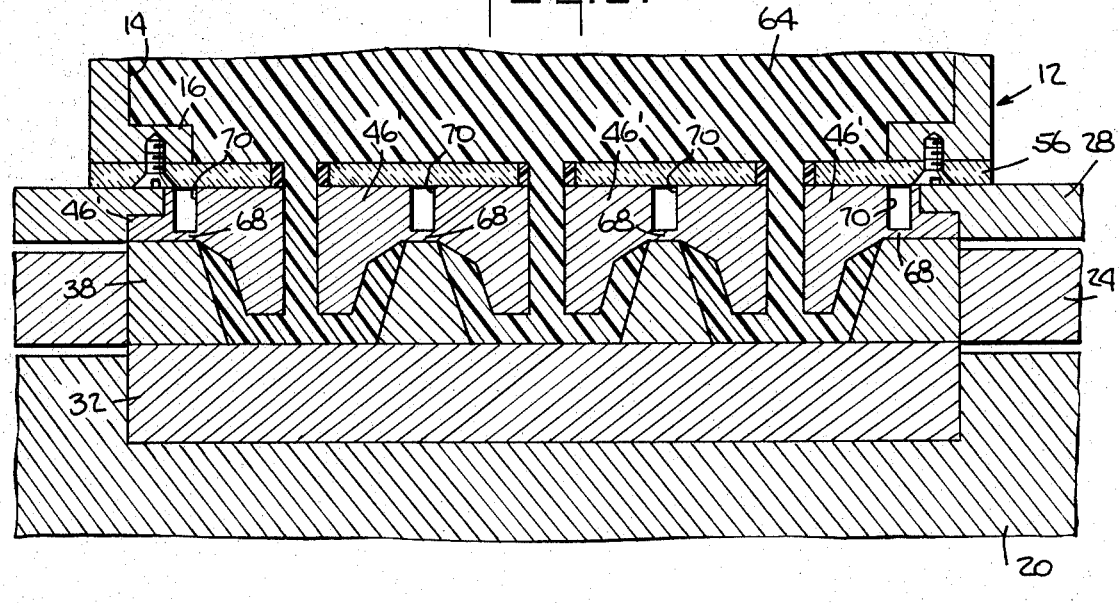
FIG. 2 is a view similar to that of FIG. 1 illustrating the lower end portion of the bottomless cylinder (absent the piston) and insulation plate pressing against the mold in which the mold cavity-defining portions are of the flashless or locally deformable variety.

Alternatively, the flexible nature of the insulation plate 56 can be utilized with flashless or locally deformable mold portions in a manner illustrated generally in FIG. 2. In this respect, the mold portions 32, 38 and 46 illustrated in FIG. 1 are generally of inflexible nature and will not yield relative to one another when pressure is exerted thereagainst by the flexible insulation plate 56. However, as illustrated in FIG. 2, the rigid upper mold portion 46 of FIG. 1 may be replaced with a flexible upper mold portion 46' having thin, flexible membranes 68 between respective segments thereof separated by voids 70. The flexible membranes 68 divide the mold portion 46', through the intermediary of the respective voids 70 above each of the membranes 68, into the respective segments which may be flexed relative to one another and likewise relative to the central mold portion 38 therebelow. This obviates parting line spacing due to tolerance inadequacies not overcome during the manufacture of the mold portions. Such a mold portion 46' prevents the formation of flash along the parting line separating the central mold portion 38 from the upper mold portion 46', immediately below each of the membranes 68.

Referring now to FIGS. 3–6, the press 100 there shown utilizes an insulation plate of the nature described above. The press 100, which is of the type used for transfer or compression molding, is provided with a base 102 and upright guide rods 104 which support a stationary cross-head 106 by means of fastening nuts 108. The stationary cross-head 106 supports thereberneath a stationary upper heating platen 110 provided with a plurality of heating channels 112 in which steam or some other conventional heating medium is confined. A downwardly facing stationary piston 114 is centrally secured to the underside of the upper heating platen 110 and cooperates with a bottomless cylinder plate 116 having an upper open end 118, and a lower open end 120. Suitably affixed to the bottom face of the cylinder plate 116, as by means of screws 121 or the like, is an insulation plate 122 which overlies the lower open end 120 of the cylinder plate. The upper open end 118 of the latter, and thus the cylinder bore, is closely matched in size and configuration, to the piston 114.

The bottomless cylinder plate 116 is suspended upon, and is axially movable relative to, the stationary cross-head 106 by means of a plurality of elongate, bolt-like guide rods 124 threadedly affixed to the plate. The rods 124 extend slidably through respective bores or passageways 126 formed in the platen 110, each passageway 126 having an upper wider portion 126a to slidably receive a wide head 124A of each rod 124, and a lower narrower portion 126B to closely slidably receive the shank of the associated bolt and simultaneously to prevent the head 124A thereof from passing downwardly therethrough. Each lower narrow bore portion 126B thus defines the lowermost limit of downward movement of the cylinder plate 116. The rods 124 extend upwardly through bores 128 in the cross-head 106. these bores being wide enough to freely accommodate the bolt heads 124A.

A plurality of downwardly open recesses 130 (only one is shown) is provided in the stationary upper heating platen 110, each recess receiving and seating a respective compression spring 132 arranged in axially surrounding relation to a guide stud 134 projecting upwardly into the recess and affixed to the upper portion of the bottomless cylinder plate 116. The compression springs 132 act to urge the bottomless cylinder plate 116 toward its at-rest or lowermost suspended position.

Centrally arranged in the base 102 is a bore 136 in which is disposed a vertically movable ram 138 supporting at its upper end a lower movable heating platen 140 having heating channels 142 therein in which is provided a suitable heating medium such as steam or the like. Mounted upon the upper surface of the lower movable heating platen 140 is a three-plate mold structure which comprises a base plate 144, a central plate 146 and an upper plate 148. The base plate 144 (see FIG. 4) is provided with an array of recesses 150, the central plate 146 with an array of recesses 152 aligned with the underlying recesses 150, respectively, and the upper plate 148 with an array of recesses 154 aligned with the underlying recesses 152. Disposed in the various recesses are respective mold cavity-defining inserts, each group of such inserts comprising an imperforate lower mold insert 156, an annular central cavity-defining insert 157, and an upper sprue insert 158. The sprue openings in the upper inserts 158 communicate with respective apertures 160 formed in the insulation plate 122. Mounted in each of the apertures 160 in the insulation plate 122 is a respective low-friction annular inset 162 of Teflon or the like.

Figure 4:
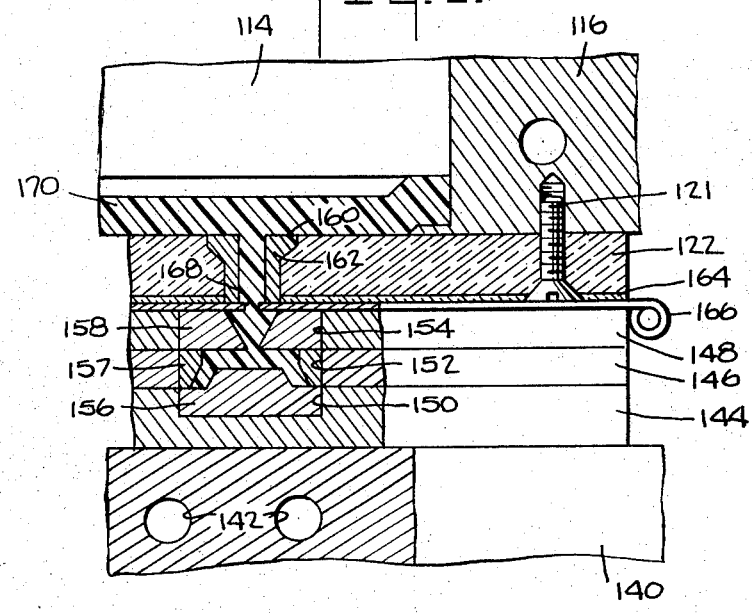
FIG. 4 is an enlarged, fragmentary, partially cross-sectional view of the lower right-side portion of the press of FIG. 3 incorporating a perforated or apertured baffle plate for use in concomitantly removing scrap from each sprue.
Figure 5:
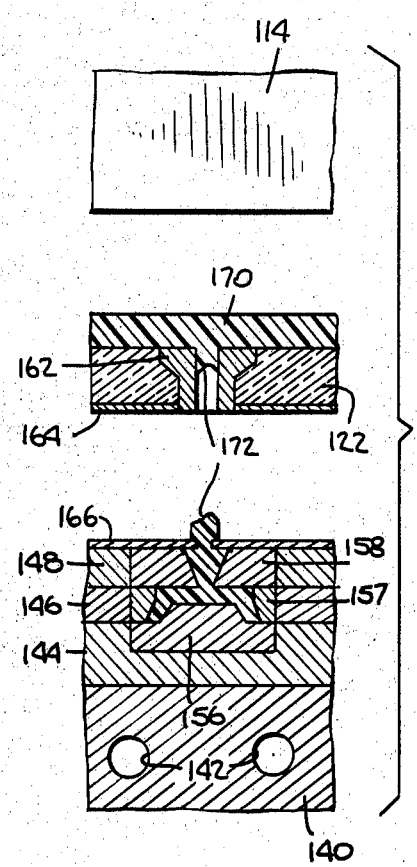
FIG. 5 is a fragmentary, cross-sectional view of the structure illustrated in FIG. 4, wherein the cylinder and mold are out of biasing relation with one another after the elastomeric stock has cured and is in a condition for removal from each mold cavity.

As best illustrated in FIGS. 4 and 5, the lower surface of the insulation plate 122 is provided with a coating or liner 164, the nature of which will be further clarified below, and a baffle plate 166 is removably mounted on the upper mold plate 148 between the latter and the liner 164. The baffle plate 166 is provided with a plurality of apertures 168 which are of reduced diameter and are aligned respectively with the sprue openings defined by the mold inserts 158 located in the upper mold plate 148.

In operation, elastomeric stock 170, in biscuit form, is initially disposed in the space between the lower surface of the piston 114 and the upper surface of the insulation plate 122. The ram 138 is then elevated, causing the lower, movable heating platen 140 to ascend until the baffle plate 166 engages the liner 164 or the insulation plate 122. The heating medium in the heating channels 112 acts at this stage to aid in the conversion of the elastomeric stock 170 from the form of a generally solid biscuit to a more fluid mass, but the heat is insufficient for curing the elastomeric stock 170. This permits a portion of the elastomeric stock 170 to be forced through the passageways in the low-friction annular insets 162 of the insulation plate 112.

As the lower heating platen 140 then continues to rise, the bottomless cylinder plate 116 is likewise caused to ascend relative to the piston 114 until the latter enters into the chamber 118 of the bottomless cylinder plate 116, causing the elastomeric stock 170 to disperse uniformly over the entire upper surface of the insulation plate 122 to be expelled in part through the low-friction annular insets 162 in the latter.

The initial quantity of the elastomeric stock 170 is in excess of that required for filling the mold cavities defined by the cooperating lower, central and upper mold inserts 156, 157 and 158, respectively. Thus, there is a substantial amount of elastomeric stock 170 which remains within the confines of the chamber defined in the bottomless cylinder plate 116 at the end of the injection stage. This ensures that the fluid injection pressure required for expelling and transferring a portion of the elastomeric stock 170 into the various mold cavities can also be maintained after and even though the cavities are all filled with molding compound.

The heat provided by the heating medium within the heating channels 142 of the lower movable platen 140 is sufficient for curing the portion of the elastomeric stock 170 transferred into the mold cavities, the curing taking place while the bottomless cylinder plate 116 and platen 140 are in contact with one another through the intermediary of the insulation plate 122. The insulation plate 122, however, serves to prevent curing of the elastomeric stock remaining within the confines of the bottomless cylinder plate 116. At the same time, the flexible nature of insulation plate 122 ensures that the fluid pressure in the cylinder can be utilized for locally deflecting the mold inserts 156, 157 and 158, which are of the flashless or locally deflectable variety, relative to one another, so that the latter may deflect where necessary to seal any gaps between their respective parting lines and obviate the formation of flash which may otherwise form at the parting lines.

Thereafter, at the end, or at least during the final stages of the cure cycle of the elastomeric stock 170 transferred into the mold cavities, the lower heating platen 140 is retracted and caused to descent relative to the upper stationery platen 110, which causes the springs 132 to move the bottomless cylinder plate 116 into its lowermost, at-rest, suspended position. When the lower heating platen 140 is sufficiently lowered, or is retracted sufficiently remote from the lower-most suspended position of the bottomless cylinder plate 116, as illustrated in FIG. 5, that inaccessible minute portion of the elastomeric stock 170 confined in each of the low-friction annular insets 162, respectively, tears medially into two portions, one of which remains in adherance with that portion of the elastomeric stock 170 remaining in the chamber of the bottomless cylinder plate 116, and the other of which remains in adherence with the portion of elastomeric stock 170 transferred into the mold cavities.

In this respect, because of the reduced diameter of the apertures 168 in the baffle plate 166, the latter acts to prevent the cured portion of the elastomeric stock 170 within the mold cavities from being pulled out of the confines of these cavities when the lower movable heating platen 140 is retracted from the insulation plate 122. Instead, the elastomeric stock portions within the confines of the low-friction annular insets 161 rupture, for example along the line 172 illustrated in FIGS. 5 and 6. Upon retraction of the platen 140, the thickness of the insulation plate 122 is, of course, such as to prevent the portions of the elastomeric stock remaining within the annular insets 162 from curing, so that those portions may be thereafter injected into the mold cavities during the next transfer cycle.

Figure 6:
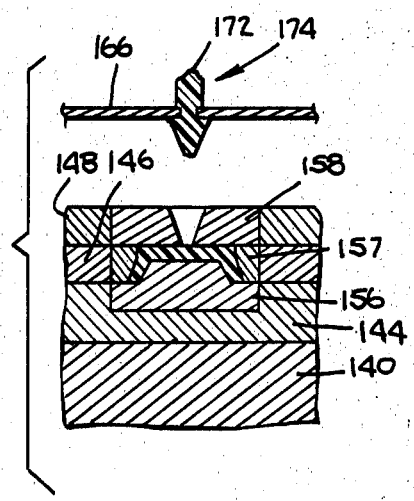
FIG. 6 is a fragmentary, cross-sectional view of the relationship of the baffle plate with scrap removed from the sprue portion of a mold cavity, the baffle plate being in an elevated condition relative to the mold.

As illustrated in FIG. 6, the baffle plate 166 may thereafter be lifted off the upper plate 148, thereby tearing minute conical portions 174 of the cured elastomeric stock out of the upper sprue inserts 158 and from the remaining molded products formed within the cavities. Since the conical extent of each sprue is minimal, the baffle plate, upon being lifted, will concurrently tear off each of the conical portions 174 as scrap.

Figure 3:
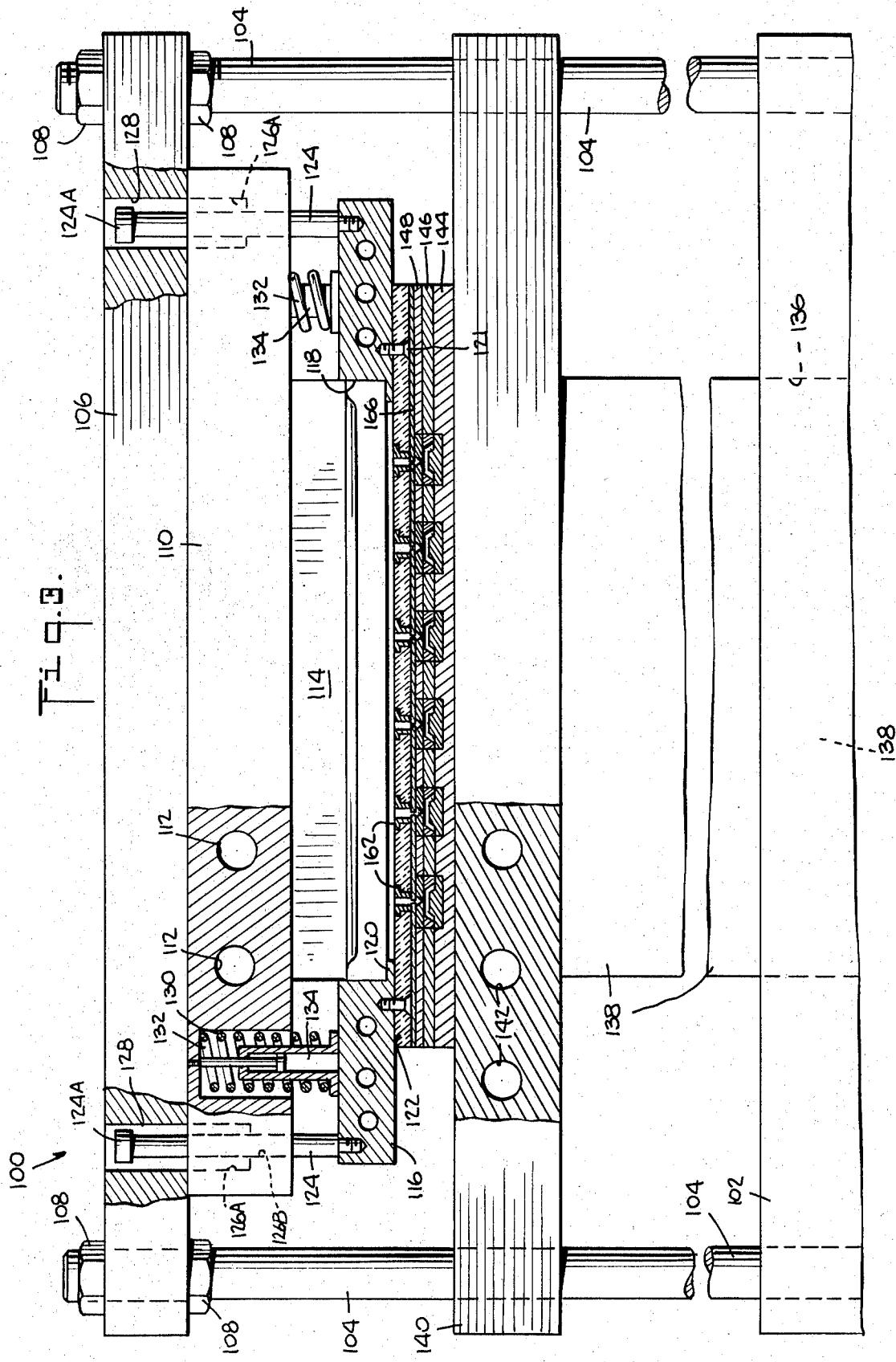
FIG. 3 is a fragmentary elevational view, partly in section, of a press illustrating the relationship of the insulation plate with a mold having inserts for defining the mold cavities, the inserts comprising insert elements which are of the flashless or locally deflectable variety.

Pursuant to a principal concept of the present invention, the insulation plate 122 and the liner 164 provided along the lower face thereof, are both of heat resistant, flexible, insulatory nature and may be formed into a composite unit by utilizing the apparatus of FIG. 3 in a simple and effective manner. In this respect, both the insulation plate 122 and the liner 164 are constituted preferably of asbestos fibers impregnated with a preferably thermosetting resin, e.g., phenol resin or the like, the thickness of the liner being at most approximately one-tenth the thickness of the insulation plate 122, the latter being preferably about 10 milimeters in thickness.

Generally speaking, the insulation plate 122 is initially cured entirely, whereas the liner 164 is left either uncured or only partially cured after being shaped into a conforming disc-like configuration. The liner 164 is then superposed onto the lower face of the insulation plate 122, preferably after the latter is fixedly mounted upon the lower surface of the bottomless cylinder plate 116, e.g., by means of screws 121. Thereafter, the heated, lower movable platen 140 is moved upwardly to press the upper mold plate 148 against the liner. The sprues in the upper sprue inserts 158 thereby form impressions in the exposed underside of the liner 164, this because the latter is initially in a less than fully cured condition and will readily receive impressions when biased against a stenciling medium such as the sprue inserts 158. Moreover, confronting profile irregularities in the plate 148 form complimentary profile irregularities in the exposed underside of the liner 164 which are useful, when cycling the apparatus, for intermeshing with one another to seal the parting line between the liner 164 and the plate 148. As the impressions are formed, the liner 164 undergoes additional curing and hardening. Preferably, though not necessarily, the bottomless cylinder plate 116 is partially filled with elastomeric stock during the period in which the upper mold plate 148 presses against the liner 164 to form the impressions in the latter. The small portion of elastomeric stock acts to hydraulically equalize the pressure against the insulation plate 122 by the piston 114 so as to compensate for various profile irregularities which may exist in the face of the piston 114 which confronts the insulation plate 122.

Thereafter, the lower heating platen 140 is retracted from both the liner 164 and insulation plate 122 thereby permitting, by suitable means, boring through both the insulation plate and the liner at the impressions formed in the latter, to form the apertures in the composite array of the liner 164 and insulation plate 122 required for establishing communication between the cylinder chamber and the sprues. The said apertures are also countersunk to receive, subsequently, the low-friction annular insets 162.

It has further been determined to be advantageous to interposition a low-friction material, such as silver-like such as aluminum foil, between the lower exposed face of the liner 164 and the upper exposed surface of the mold plate 148 prior to the latter being pressed against the liner 164. This thin layer of metallic or silver-like foil, upon being subjected to the liner-curing pressure, will adhere to the liner 164 and prevents the upper plate 148 from adhering to the liner 164 when the latter undergoes its final curing. The foil thus will permit retraction of the plate 148 away from the liner 164 upon appropriate retraction of the lower heating platen 140 while still leaving bore-defining impressions in the liner 164. The metallic foil adhering to the liner 164 also acts to provide the latter with a capacity to subsequently resist adhering to the upper plate 148 upon repeated contact with the latter during cycling of elastomeric stock into the respective mold cavities.

Each of the embodiments described above has been characterized as including an insulation plate which is fixedly mounted upon the bottomless cylinder or injection unit and operates to thermally isolate the mold from the elastomeric stock confined within the cylinder. However, the invention likewise contemplates the utilization of an insulation plate which is mounted upon the injection unit so that it is at least slightly movable axially relative to the injection unit for purposes to be further clarified below.

Figure 9:
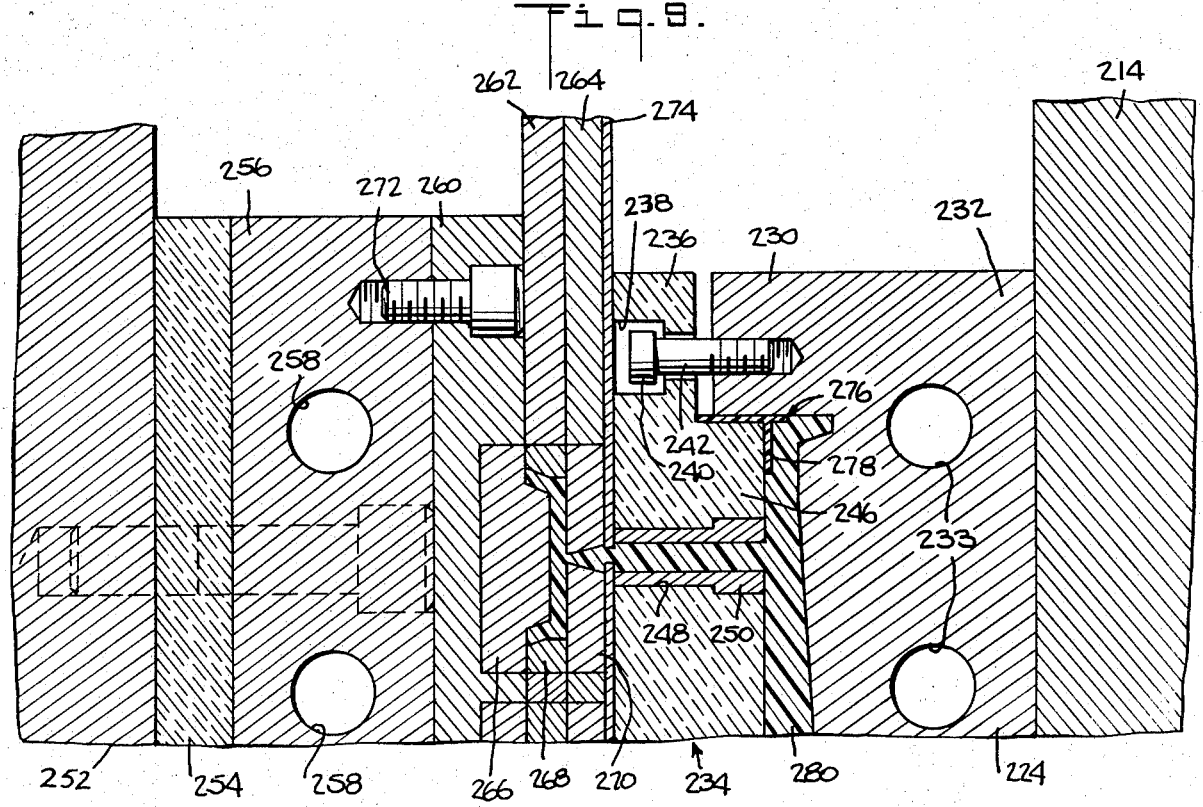
FIG. 9 is still a further enlarged fragmentary, vertical, cross-sectional view illustrating more clearly the manner that the axially movable insulation plate is operatively mounted upon the bottomless injection cylinder.

In this respect, referring now to FIGS. 7–9 and more particularly to FIG. 7, still a third embodiment of the apparatus pursuant to the present invention is there illustrated which likewise relates to transfer molding apparatus denoted by the reference character 200. The apparatus 200 includes a base 202 upon which is provided an upstanding support block 204 carrying a plurality of horizontal guide rods 206, and adjacent which is provided a toggle-linkage support and actuation assembly 208. The assembly 208 is operatively associated with a toggle-linkage array 210 (of conventional nature) for effecting movement of a mold assembly 212 along the horizontal guide rods 206, toward and away from a stationary injection unit 214 affixed to and supporting opposite ends 215 of the rods 206.

Operatively associated with the injection unit 214 is an elastomeric stock input source 216 which communicates with the injection unit 214 through the intermediary of an injection cylinder 218 (of bottomless cylinder variety) in which is constrained a movable piston 220 (FIG. 8). The piston 220 is associated with a support block and piston actuation unit 222 for movement relative to the interior of the injection cylinder 218, as will be clarified below. The injection cylinder 218 comprises an adapter 224, the interior of the latter communicating axially with the piston-confining chamber 226 within the injection cylinder 218. A transition chamber 228 is disposed between, and intercommunicates, the adapter 224 and chamber 226.

The adapter 224 is provided with a cylindrical flange or wall 230 which merges internally with a generally frustoconical, outwardly diverging wall 232, the latter centrally communicating with the transition chamber 228 which diverges from a point at the end of the piston-confining chamber 226 to the interior of the adapter 224. The diverging wall 232 of the adapter 224 is provided with a plurality of channels 233 in which is disposed an appropriate heating or cooling medium such as steam, water, or oil, etc.

A heat-resistant, flexible, end insulation plate 234 having an enlarged exposed flange 236 is operatively mounted on the adapter 224 and confronts the mold assembly 212. In this respect, the insulation plate 234 may be simply held frictionally along the periphery thereof by the adapter 224. Alternatively, the exposed flange 236 of the insulation plate 234 may be provided with an array of circumferentially spaced, axially extending, recesses 238 in each of which is slidably received a head 240 of a respective mounting bolt 242, each of the mounting bolts 242 terminating in an opposite end 244 which is threadedly, or otherwise, fixed to the cylindrical flange 230 of the adapter 224. The concealed body portion 246 of reduced diameter of the insulation plate 234 is slidably received within the confines of the cylindrical flange 230 of the adapter 224.

The end insulation plate 234 is provided with an array of apertures 248 in which are confined respective low-friction annular insets 250 which are generally T-shaped in cross-section and communicate with the mold assembly 212. The mold assembly 212 is provided with an end plate 252 along which is superposed a heat-resistant insulation sheet 254 constituted of any suitable insulatory material having an appropriate thickness for preventing the end plate 252 from overheating as a result of heat generated by a heating platen 256. The platen 256 is provided with heating channels 258 for heating the mold assembly 212 and is superposed along the insulation sheet 254 opposite that surface of the latter which is in contact with the end plate 252.

Superposed along the heating platen 256 is an assembly of mold plates comprising an inner or bottom mold plate 260, a central mold plate 262 superposed upon the inner mold plate 260, and an outer mold plate 264 superposed upon the central mold plate 262. The mold plates 260, 262 and 264 are each provided with an array of apertures, the apertures of each array being coaxially aligned with respective apertures of the other arrays. Each group of aligned apertures acts as a receptacle for a respective one of a plurality of inner mold inserts 266, one of a plurality of central cavity-defining mold inserts 268, and one of a plurality of outer sprue inserts 270, each resting upon one another for defining respective mold cavities into which elastomeric stock may be injected and cured. The inserts 266, 268 and 270, respectively, are as a group of flashless or locally deflectable nature, and function, by moving slightly relative to one another, in the manner described above for the mold inserts illustrated in FIGS. 3–6.

A plurality of circumferentially spaced bolts 272 act to affix the inner mold plate 260 to the heating platen 256, whereas the central mold plate 262 and outer mold plate 264 are detachably associated (FIG. 9) with one another, with the inner mold plate 260 and with an apertured baffle plate 274 (by conventional means not shown). The baffle plate 274 is exposed and confronts the insulation plate 234 to be biased against the latter, as will be described below.

As best illustrated in FIG. 9, the insulation plate 234 is surrounded by a flexible gasket or sealing ring 276 internally of which extends a flexible annular rib 278 which rests upon the interior of the insulation plate 234, the flexible rib 278 deforming slightly to optimize sealing of the movable insulation plate 234 relative to the adapter 234 during injection of elastomeric stock 280 into the respective mold cavities in the mold assembly 212.

In operation, the toggle-linkage array 210, which is only schematically illustrated but, as generally understood, is comprised of a plurality of links which are movable into an over-center locking position, acts to move the mold assembly 212 toward the injection cylinder 218. Elastomeric stock 280 is introduced into the piston-confining chamber 226 of the injection cylinder 218, and is of such a quantity that it is in excess of that which is necessary to fill each and every one of the mold cavities. The heating medium within the confines of the heating channels 233 acts to impart a degree of fluidity to the elastomeric stock 280, so that when the latter is acted upon by the piston 220, it will readily flow along the frustoconical diverging wall 232 of the adapter 224, through the respective apertures within the low-friction annular insets 250, while exerting a uniform pressure against the insulation plate 234 in an axially outward direction thereby causing the insulation plate 234 to move to its axially outermost position.

As the insulation plate 234 is caused to move toward its axially outermost position, the insulation plate 234 engages the baffle plate 274 mounted upon the mold assembly 212 and exerts a likewise uniform pressure thereagainst. The baffle plate 274 which is likewise somewhat flexible acts to transmit and exert a pressure against each and every one of the mold inserts 266, 268 and 270 thereby causing the latter inserts to deflect locally relative to one another and close all, if any gaps at the parting lines therebetween. As the gaps at the parting lines between the mold inserts are diminished, there is likewise diminished the likelihood of the formation of flash upon the portion of elastomeric stock transferred into the mold cavities.

As the movement of the piston 220 toward the adapter 224 continues, of course, it causes a prescribed quantity of the elastomeric stock 280 to be expelled through the low-friction annular insets 250 and injected into the confines of the mold cavities. The portion of the elastomeric stock 280 tranferred into the mold cavities then undergoes curing by means of the heat supplied by the heating medium confined within the heating channels 258 of the heating plate 256. However, because of the interposition of the insulation plate 234 between the mold cavities and the interior of the adapter 224, the remainder of the elastomeric stock 280 within the confines of the adapter 224 is prevented from curing despite the continued engagement of the heated mold assembly 212 with the stationary injection unit 214.

At the end of the curing process, or at least toward the very final stages of curing, the toggle-linkage array 210 is operated to retract the mold assembly 212 away from the end insulation plate 234, permitting emptying of the molded products from the mold cavities. Since the baffle plate 274 has been moved away from the insulation plate 234, the latter may be caused to move into its extreme, axially, outermost position by the stock 280 remaining in the cylinder 219, this by shifting the piston slightly toward the adapter 224, to await return of the mold assembly 212, after emptying of the latter, into engagement therewith.

In this respect, at the end of the curing process the baffle plate 274 can be utilized for concurrently removing elastomeric scrap that has cured within the confines of the sprues of the outer sprue inserts 270, and the mold cavities can then be emptied for recycling into operative association with the injection cylinder 218. Once vacant, the mold cavities can then be moved, through the intermediary of the toggle-linkage array 210, into proximity with the insulation plate 234. The baffle plate 274 will then engage the insulation plate 234 and move the latter inwardly of the adapter 224 thereby causing, without any movement of the piston 220 whatsoever, expulsion and transferring of a further portion of elastomeric stock 280 into the mold cavities.

Thus, the apparatus pursuant to the embodiment of FIGS. 7-9 permits filling of the mold cavities by two different methods. In one, the piston 220 can be utilized, as discussed above, for causing expulsion of elastomeric stock 280 from the confines of the adapter 224 into the mold cavities. In the alternative method, the adapter 224 can be filled to such an extent that, upon retraction of the mold assembly 212 and a slight forward movement of the piston 220 during retraction of the mold assembly 212, the insulation plate 234 is moved to its extreme, axially outermost position. Upon return movement of the mold assembly 212 thereafter into engagement with the insulation plate 234, the latter is forced slightly into the interior of the adapter 224, causing expulsion of a portion of the elastomeric stock 280 into the confines of the mold cavities for curing.

Numerous alterations of the structure herein disclosed will suggest themselves to those skilled in the art. However, it is to be understood that the present disclosure relates to preferred embodiments of the invention which are for purposes of illustration only and not to be construed as a limitation of the invention.

What is claimed is:

1. Apparatus for molding elastomeric stock, said apparatus comprising: a mold provided with a plurality of mold cavities for shaping and curing elastomeric stock in the form of said cavities; an elastomeric stock injection unit having a chamber in which elastomeric stock is disposable and can be subjected to pressure for transfer from said chamber; a heat-resistant, flexible insulation plate positioned intermediate said mold and said injection unit, said insulation plate having flat, opposed, side faces which are capable of flexing in response to pressure thereagainst, at least one of said side faces forming a parting line between said mold and said injection unit, said insulation plate including a plurality of apertures therethrough for intercommunicating said injection unit with said mold cavities; means for heating said mold; and means for moving said mold and said injection unit relative to one another and said insulation plate in such a manner that said mold on one side face of said insulation plate and said injection unit and said elastomeric stock in said injection unit on the other side face of said insulation plate are pressed against the opposite side faces of said insulation plate to flexibly conform said insulation plate to, and tightly seal, varying surface irregularities of said mold and said injection unit pressing thereagainst; whereby upon exertion of pressure in said chamber against said elastomeric stock a portion of said stock will be expelled from said chamber and concurrently transferred through each of said plurality of apertures into the cavities of said heated mold to fill said cavities under substantially uniform fluid pressure without seepage of said elastomeric stock between said mold or said injection unit and said insulation plate, said insulation plate serving to thermally insulate the remaining portion of elastomeric stock in said chamber from said heated mold, without separation of said mold or said injection unit from said insulation plate or relaxation of said fluid pressure, in order to prevent the curing of said remaining portion of stock with the curing of said transferred portion of stock.

2. Apparatus as claimed in claim 1, wherein said mold includes an exposed end face and wherein said insulation plate is affixed to said injection unit and serves to enclose one end of said chamber, said end face of said mold and one side face of said insulation plate being in confronting, separable relationship with one another.

3. Apparatus as claimed in claim 2, wherein at least an endmost axial portion of said chamber directly confronts and is laterally coextensive with said insulation plate, said insulation plate having a projected area, pressurized by said elastomeric stock, greater than the combined projected area of said mold cavities.

4. Apparatus as claimed in claim 2, wherein said mold includes a plurality of mating sections detachably superposed upon one another which cooperatively define said mold cavities.

5. Apparatus as claimed in claim 4, wherein said mating sections of said mold are substantially inflexible.

6. Apparatus as claimed in claim 4, wherein said mating sections of said mold are at least partially flexible and deform locally at each of said cavities in response to pressure exerted thereagainst via said insulation plate.

7. Apparatus as claimed in claim 2, wherein said mold includes means defining a plurality of insert-receiving recesses, and a plurality of movable groups of inserts removably disposed in said recesses, respectively, each of said insert groups including a plurality of mating elements cooperatively defining a respective mold cavity, corresponding portions of said insert groups presenting said exposed end face of said mold and being locally movable in response to pressure exerted thereon via said insulation plate.

8. Apparatus as claimed in claim 7, wherein said means defining said plurality of insert-receiving recesses includes a plurality of plates superposed upon one another, with the recesses in each plate being aligned with the corresponding recesses of the other plates, each of said recesses receiving a respective one of the inserts of the respective insert group.

9. Apparatus as claimed in claim 2, wherein said mold and said injection unit are movable vertically relative to one another.

10. Apparatus as claimed in claim 2, wherein said mold and said injection unit are movable horizontally relative to one another.

11. Apparatus as claimed in claim 2, wherein said insulation plate is fixedly connected to said injection unit.

12. Apparatus as claimed in claim 11, wherein said injection unit includes a stationary piston and a cylinder axially movable relative thereto, said mold being supported for axial movement relative to said piston, such that said mold is movable into engagement with said cylinder and is then effective to move the the latter relative to said piston to reduce the axial extent of said chamber, thereby to cause a portion of said elastomeric stock to be injected from said chamber into said mold cavities.

13. Apparatus as claimed in claim 2, including a multi-apertured baffle plate detachably interpositioned between said insulation plate and said exposed end face of said mold, said apertures in said baffle plate being aligned with corresponding ones of said apertures in said insulation plate, said apertures of said baffle plate being of reduced diameter and constituting means for permitting break-away separation of the molded products formed in said mold cavities from elastomeric stock scrap formed in part in the sprue portions of said mold adjacent said insulation plate.

14. Apparatus as claimed in claim 2, wherein said insulation plate has a thermal-conductive capacity which is substantially less than the thermal-conductive capacity of iron.

15. Apparatus as claimed in claim 14, wherein the thermal conductivity of said insulation plate is in the range of 0.05–0.5 kcal/m/hr./°K.

16. Apparatus as claimed in claim 2, wherein said insulation plate has a compression resistance in the range of 200–2,000 kg./cm.$^2$ at temperatures between 180°–200°C.

17. Apparatus as claimed in claim 2, wherein said insulation plate has a modulus of elasticity of at least 1.5 × 10$^5$ kg./cm.$^2$.

18. Apparatus as claimed in claim 2, wherein said insulation plate is constituted of an asbestos fiber and thermoset resin mixture.

19. Apparatus as claimed in claim 18, wherein said thermoset resin comprises phenol resin.

20. Apparatus as claimed in claim 2, wherein said insulation plate includes, on the side face thereof which confronts and contacts said mold, aa thin layer of hardenable, flexible material which undergoes increasing hardening when subjected to the heat and pressure of said heated mold, said layer having on the surface thereof facing said mold a profile complementary to the profile of the surface of said mold in contact therewith.

21. Apparatus as claimed in claim 20, wherein said thin layer is constituted of an asbestos fiber and thermoset resin mixture.

22. Apparatus as claimed in claim 21, wherein said thermoset resin of said thin layer comprises phenol resin.

23. Apparatus as claimed in claim 2, wherein said insulation plate has a thickness sufficient to maintain a temperature gradient thereacross such that, when the side face thereof which confronts said mold is at the curing temperature for said elastomeric stock in said mold cavities, the temperature on the opposite side face of said insulation plate which confronts said chamber remains at a temperature insufficient to cause the excess elastomeric stock remaining in said chamber to become cured.

24. Apparatus as claimed in claim 2, including respective annular insets disposed in said apertures of said insulation plate, said annular insets being constituted of a material having an adhesion resistance to said elastomeric stock greater than that of said insulation plate.

25. Apparatus as claimed in claim 24, wherein said annular insets are constituted at least in part of polytetrafluoroethylene or a like material.

26. Apparatus for molding elastomeric stock, said apparatus comprising: a heated mold provided with a plurality of mold cavities for shaping and curing elastomeric stock in the form of said cavities; an elastomeric stock injection unit having a chamber in which elastomeric stock is disposable and can be subjected to pressure for transfer from said chamber; a multi-apertured, heat-resistant, flexible insulation plate carried by said injection unit at an end of said chamber, the apertures of said plate communicating with corresponding ones of said mold cavities; a correspondingly multi-apertured, flexible liner superposed along and affixed to one side face of said plate and confronting said mold, said liner having pre-formed profile irregularities, along the surface thereof which confronts and forms a parting line with said mold, which are complimentary to and under pressure flexibly intermesh with profile irregularities of the confronting surface of said mold; and means for moving said mold and injection unit relative to one another such that said confronting surface of said mold is pressed against said liner and said complimentary profile irregularities of each sealingly intermesh with one another; whereby, without separation of said mold and injection unit, upon exertion of pressure in said chamber against said stock a portion of the latter will be expelled from said chamber and transferred through the apertures in said plate and liner into said mold cavities without seepage of elastomeric stock at the parting line between said mold and liner and without curing of elastomeric stock in said injection unit curing curing of elastomeric stock in said mold cavities.

27. Apparatus as claimed in claim 26, including means for heating said mold, said plate being made of thermal insulatory material.

28. Apparatus as claimed in claim 27, wherein said liner and said plate are each constituted of an asbestos fiber and thermoset resin mixture.

* * * * *